(12) United States Patent
Horowitz

(10) Patent No.: US 8,311,590 B2
(45) Date of Patent: Nov. 13, 2012

(54) SYSTEM AND METHOD FOR IMPROVED LOUDSPEAKER FUNCTIONALITY

(75) Inventor: Ronald J. Horowitz, Vallejo, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1711 days.

(21) Appl. No.: 11/634,817

(22) Filed: Dec. 5, 2006

(65) Prior Publication Data

US 2008/0132295 A1 Jun. 5, 2008

(51) Int. Cl.
H04B 1/38 (2006.01)

(52) U.S. Cl. ......... 455/570; 381/66; 381/83; 381/93; 455/569.1; 379/406.01; 379/406.02; 379/406.05

(58) Field of Classification Search ......... 381/57, 381/66, 71.1, 71.5, 71.6, 74, 83, 93; 379/406.01–406.5; 455/569.1–569.2, 570
See application file for complete search history.

(56) References Cited

U.S. PATENT DOCUMENTS

| | | | |
|---|---|---|---|
| 4,629,829 A | 12/1986 | Puhl et al. | |
| 5,133,013 A | 7/1992 | Munday | |
| 5,172,408 A | 12/1992 | Petty et al. | |
| 5,432,859 A | 7/1995 | Yang et al. | |
| 5,491,747 A | 2/1996 | Bartlett et al. | |
| 5,524,058 A | 6/1996 | Moseley | |
| 5,555,449 A | 9/1996 | Kim | |
| 5,732,143 A * | 3/1998 | Andrea et al. | 381/71.6 |
| 5,790,657 A * | 8/1998 | Fujiwara | 379/406.07 |
| 5,937,070 A | 8/1999 | Todter et al. | |
| 5,982,883 A * | 11/1999 | Alix et al. | 379/433.12 |
| 6,957,089 B2 | 10/2005 | Oh et al. | |
| 6,978,010 B1 | 12/2005 | Short et al. | |
| 7,031,460 B1 | 4/2006 | Zheng et al. | |
| 2002/0106077 A1 | 8/2002 | Moquin et al. | |
| 2003/0185403 A1 | 10/2003 | Sibbald | |
| 2004/0062388 A1 | 4/2004 | MacDonald et al. | |
| 2004/0192243 A1 | 9/2004 | Siegel | |
| 2004/0214614 A1 | 10/2004 | Aman | |
| 2004/0234084 A1 * | 11/2004 | Isberg et al. | 381/113 |
| 2005/0026568 A1 * | 2/2005 | Hawker et al. | 455/70 |
| 2006/0140428 A1 * | 6/2006 | Qi et al. | 381/315 |
| 2006/0188089 A1 | 8/2006 | Diethorn et al. | |
| 2007/0036342 A1 * | 2/2007 | Boillot et al. | 379/406.01 |
| 2007/0223736 A1 * | 9/2007 | Stenmark et al. | 381/103 |

FOREIGN PATENT DOCUMENTS

CA 2229424 4/2001

OTHER PUBLICATIONS

Noise Gate—Wikipedia, The Free Encyclopedia, printed from the website http://en.wikipedia.org/widi/noise-gate, dated Oct. 24, 2006.

* cited by examiner

*Primary Examiner* — Disler Paul

(57) ABSTRACT

An electronic device comprises a microphone, a transceiver circuit, a loudspeaker, a sense element and a processing circuit. The microphone is configured to receive a first audio signal. The transceiver circuit is configured to communicate the first audio signal to a remote device and to receive a second audio signal from the remote device. The loudspeaker is configured to provide an audible signal based on the second audio signal. The sense element is configured to sense the audible signal provided by the loudspeaker. The sense element may be positioned at a distance from the loudspeaker different than a distance between the microphone and the loudspeaker. The processing circuit is configured to process at least one of the first audio signal and the second audio signal based on a sensed signal from the sense element.

18 Claims, 6 Drawing Sheets

SYSTEM AND METHOD FOR IMPROVED LOUDSPEAKER FUNCTIONALITY

BACKGROUND

Some electronic devices have speakerphone capabilities by use of a microphone and loudspeaker. Speakerphones require some form of acoustic separation between the microphone and loudspeaker to prevent echo and other interference with the microphone. Also, speakerphones suffer from nonlinearities in their audio output caused by such things as distortion and non-linear frequency response.

Conventional methods use a prediction of acoustical feedback from a loudspeaker to a speakerphone microphone based on a linear assumption of the loudspeaker's output. Some methods attempt to use echo cancellers, non-linear processing, or noise gates.

Further, some high-fidelity loudspeakers use sense elements and feedback to linearize their outputs.

However, there is a need for an improved system and method for attenuating or eliminating acoustical feedback from a loudspeaker to a microphone. Further, there is a need for an improved system and method for reducing nonlinearities in a speakerphone system. Further still, there is a need to move from a half duplex speakerphone system closer to a full duplex speakerphone system.

The teachings herein extend to those embodiments which are within the scope of the appended claims, regardless of whether they accomplish one or more of the above-mentioned needs.

DETAILED DESCRIPTION OF EXEMPLARY EMBODIMENTS

Figure 1:
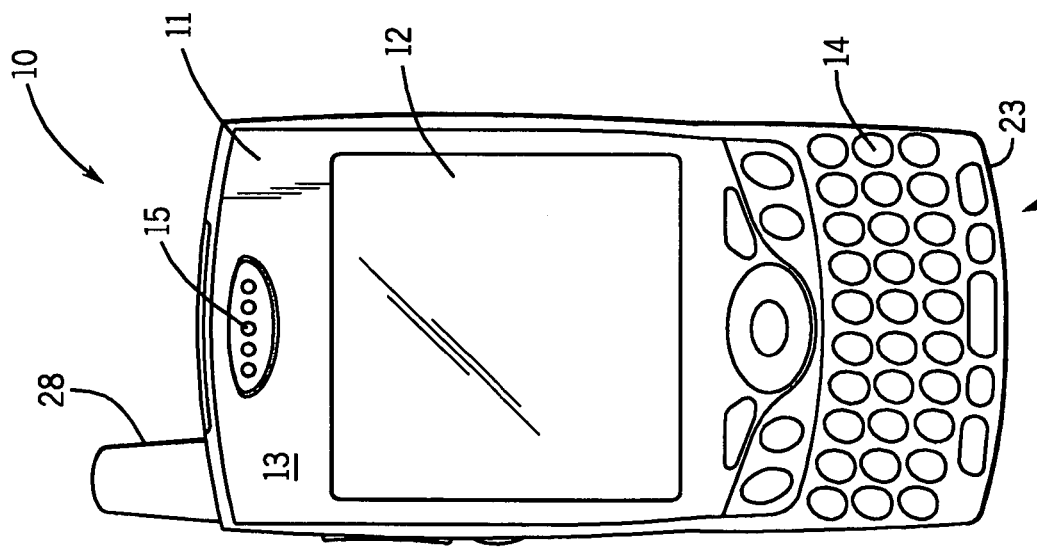
FIG. 1 is a front view of a mobile computing device, according to an exemplary embodiment.

Referring first to FIG. 1, a mobile computing device 10 is shown. Device 10 is a smart phone, which is a combination mobile telephone and handheld computer having personal digital assistant functionality. The teachings herein can be applied to other mobile computing devices (e.g., a laptop computer) or other electronic devices (e.g., a desktop personal computer, home or car audio system, etc.). Personal digital assistant functionality can comprise one or more of personal information management, database functions, word processing, spreadsheets, voice memo recording, etc. A smart phone is configured to synchronize personal information from one or more applications with a remote computer (e.g., desktop, laptop, server, etc.). Device 10 is further configured to receive and operate additional applications provided to device 10 after manufacture, e.g., via wired or wireless download, memory card, etc.

Figure 2:
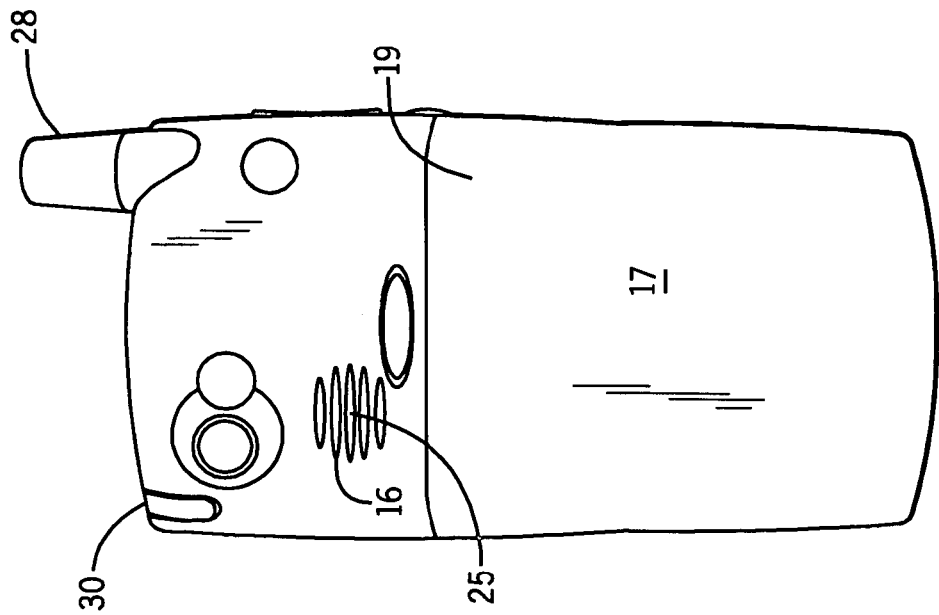
FIG. 2 is a back view of the mobile computing device of FIG. 1, according to an exemplary embodiment.

Device 10 comprises a display 12 and a user input device 14 (e.g., a QWERTY keyboard, buttons, touch screen, speech recognition engine, etc.). Device 10 also comprises a speaker 15 (e.g., an earpiece speaker). Speaker 15 may be a speaker configured to provide audio output with a volume suitable for a user placing speaker 15 against or near the ear. Speaker 15 may be a part of an electrodynamic receiver, such as part number 419523 manufactured by Foster Electric Co., Ltd., Japan. Speaker 15 may be positioned above display 12 or in another location on device 10. Device 10 comprises a housing 11 having a front side 13 and a back side 17 (FIG. 2). Speaker 15 may be positioned on the front side 13 along with display 12 and user input device 14, and a loudspeaker 16 (or other speaker or transducer) may be positioned on the back side along with a battery compartment 19. Positioning loudspeaker 16 on back side 17 may be advantageous when using a directional sense element 21 on front side 13.

Device 10 further comprises a sense element 21 (e.g., a microphone, such as a surface mount or other microphone, or other acoustic sense element) coupled to a bottom edge 23 of housing 11. Device 10 further comprises a sense element 25 (e.g., a feedback sense element, which may also be a microphone or other acoustic sense element, such as an infrared sensor, which may use Doppler interferometry) configured to sense an audible signal provided by loudspeaker 16. In alternative embodiments, display 12, user input device 14, speaker 15, loudspeaker 16, and sense elements 21, 25 may each be positioned anywhere on front side 13, back side 17 or the edges therebetween.

Loudspeaker 16 is an electro-acoustic transducer that converts electrical signals into sounds loud enough to be heard at a distance. Loudspeaker 16 can be used for a speakerphone functionality. While loudspeaker 16 may be configured to produce audio output at a plurality of different volumes, it is typically configured to produce audio output at a volume suitable for a user to comfortably hear at some distance from the speaker, such as a few inches to a few feet away. Loudspeaker 16 may be an electrodynamic loudspeaker, such as part number HDR 9164, manufactured by Hosiden Corporation, Okasa, Japan.

Figure 3:
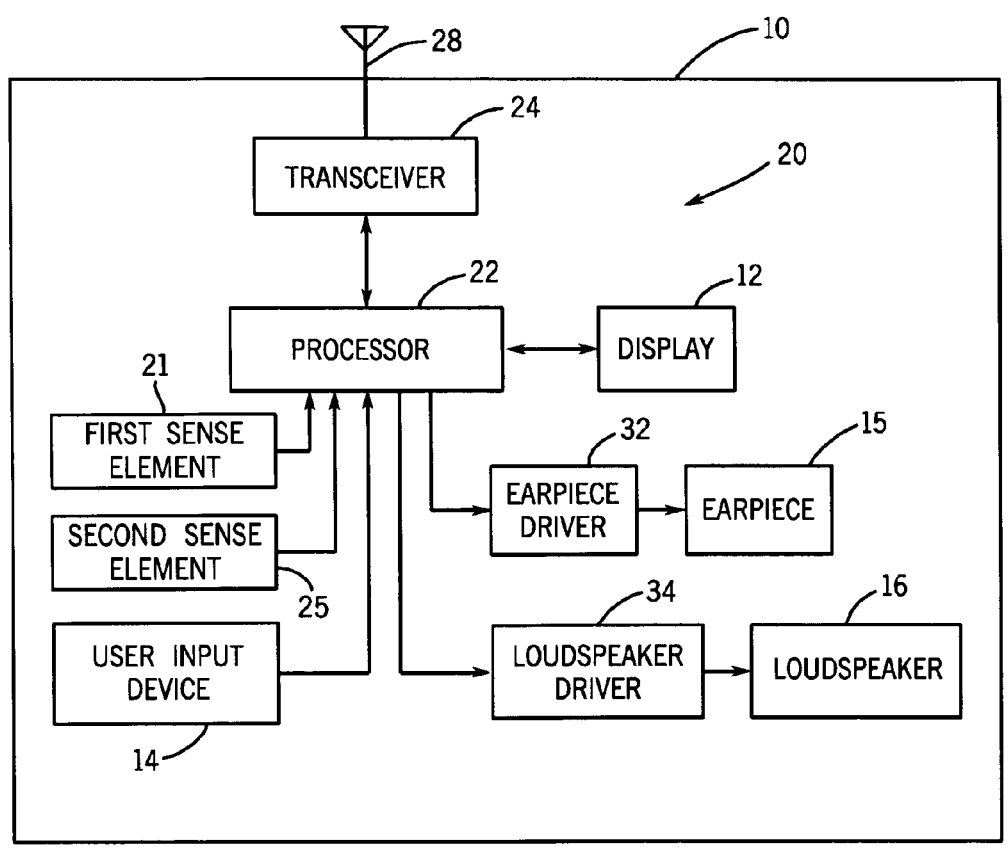
FIG. 3 is a block diagram of the mobile computing device of FIG. 1, according to an exemplary embodiment.

Referring now to FIG. 3, device 10 comprises a processing circuit 20 comprising a processor 22. Processing circuit 20 can comprise one or more microprocessors, microcontrollers, and other analog and/or digital circuit components configured to perform the functions described herein. Processing circuit 20 comprises memory (e.g., random access memory, read only memory, flash, etc.) configured to store software applications provided during manufacture or subsequent to manufacture by the user or by a distributor of device 10. In one embodiment, processor 22 can comprise a first, applications microprocessor configured to run a variety of personal information management applications, such as calendar, contacts, e-mail, etc., and a second, radio processor on a separate chip (or as part of a dual-core chip with the application processor). The radio processor is configured to operate telephony and/or data communication functionality. Device 10 can be configured to use the radio processor for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured to use the radio processor for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a transceiver circuit 24 which comprises analog and/or digital electrical components configured to receive and transmit wireless signals via antenna 28 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a wide area network, such as WiMax, a local area network, such as Ethernet or according to an IEEE 802.11x standard or a personal area network, such as a Bluetooth or infrared communication technology.

Display 12 can comprise a touch screen display in order to provide user input to processor 22 to control functions, such as to dial a telephone number, enable/disable speakerphone audio, provide user inputs regarding increasing or decreasing the volume of audio provided through speaker 15 and/or loudspeaker 16, etc. Alternatively or in addition, user input device 14 (which can comprise one or more buttons, switches, dials, a track ball, a four-way or five-way switch, etc.) can provide similar inputs as those of touch screen display 12. Device 10 can further comprise a stylus 30 to assist the user in making selections on display 12. Processor 22 can further be configured to provide video conferencing capabilities by displaying on display 12 video from a remote participant to a video conference, by providing a video camera on device 10 for providing images to the remote participant, by providing text messaging, two-way audio streaming in full- and/or half-duplex mode, etc.

Sense element 21 is configured to receive audio signals, such as voice signals, from a user or other person in the vicinity of device 10, typically by way of spoken words. Sense element 21 is configured as an electro-acoustic sense element to provide audio signals from the vicinity of device 10 and to convert them to an electrical signal to provide to processor 22. Processor 22 can provide a digital voice recorder function, wireless telephone function, push-to-talk function, etc. with audible words spoken into sense element 21. Processor 22 may also provide speech recognition and/or voice control of features operable on device 10 with audible words spoken into sense element 21.

Referring again to FIG. 3, an speaker driver circuit 32 and a loudspeaker driver circuit 34 are provided, which may comprise analog and/or digital circuitry configured to receive audio data from processor 22 and to provide filtering, signal processing, equalizer functions, or other audio signal processing steps to audio data. For example, the incoming audio data can comprise one or more of a downlink signal received by transceiver circuit 24 from a remote participant to a telephone call or a video conference, prerecorded audio, or audio from a game or audio file stored on device 10, etc. Drivers 32, 34 may then provide the audio data to speaker 15 and/or loudspeaker 16 to provide the audio to a user or another person in the vicinity of device 10. Drivers 32, 34 may be part no. TPA6203A1, manufactured by Texas Instruments Inc., Dallas, Tex.

Figure 4:
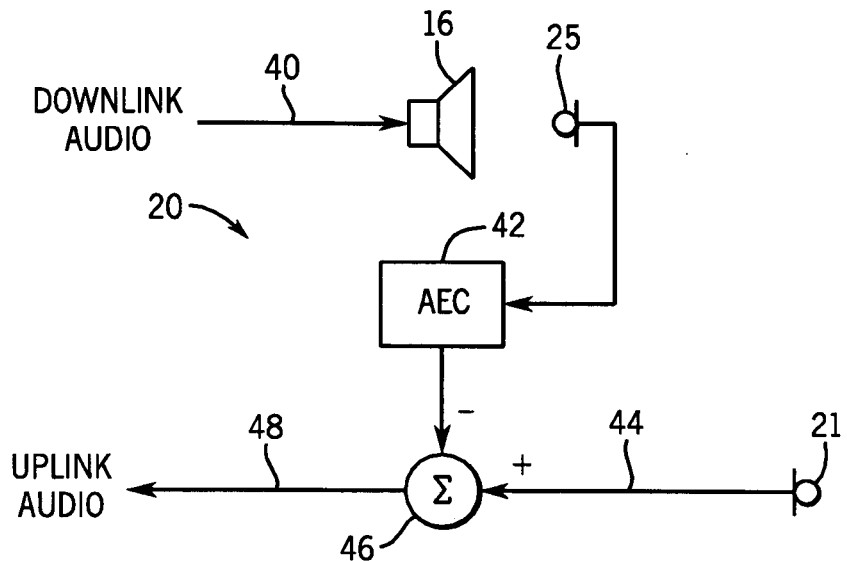
FIG. 4 is a block diagram of a system for reducing acoustical feedback from a loudspeaker to a microphone, according to an exemplary embodiment.

Referring now to FIG. 4, a block diagram showing an exemplary system for reducing acoustic feedback is shown. Transceiver circuit 24 is configured to receive an audio signal from a remote computing device, which can be a downlink audio signal 40. Downlink audio signal 40 can be provided by processing circuit to loudspeaker 16. Loudspeaker 16 is configured to provide an audible signal based on the downlink audio signal. Sense element 25 is configured to sense the audible provided by the loudspeaker 16. Sense element 25 is positioned at a distance from loudspeaker 16 different than a distance between sense element 21 and loudspeaker 16. The distance may be greater or less than the distance between sense element 21 and loudspeaker 16.

Sense element 25 is configured to provide a sensed signal to processing circuit 20 which comprises an audio echo canceller 42. Echo canceller 42 can comprise analog and/or digital electronics configured to provide an echo cancellation process to a first audio signal 44 provided by sense element 21. Echo canceller 42 can comprise computer instructions stored on the computer-readable medium, such as a microprocessor, digital signal processor, etc. Echo canceller 42 can further provide a suitable delay in echo cancellation output signals provided by processor 22 to summation circuit 46. The delay can be predetermined based on the acoustical characteristics of the acoustic path between loudspeaker 16 and sense element 25 and the acoustic characteristics of the acoustic path between loudspeaker 16 and sense element 21. Summation circuit 46 is configured to process first audio signal 44 by, for example, attenuating or reducing that portion of first audio signal 44 comprising feedback or other audio signals from loudspeaker 16. The processed signal is provided by summation circuit 46 as an output signal (e.g., an uplink audio signal 48) for uplink to transceiver circuit 24 for a wireless telephony communication. The functions of echo canceller 42 and summation circuit 46 can be combined in a single algorithm or processor, or may be provided by separate circuit components.

Sense element 25 may be positioned at any of a plurality of locations on or coupled to housing 11 or components within housing 11, such as a portion of housing, printed circuit board, display board, etc. Sense element 25 can comprise a unidirectional, omni-directional, or other type of microphone. Sense element 25 can be closer to loudspeaker 16 than sense element 21, and may be positioned within 1 centimeter, 2 centimeters, or within 5 centimeters, or more of loudspeaker 16. Sense element 21 can be positioned more than 3 centimeters from loudspeaker 16. Sense element 21 may be closer than 3 centimeters to loudspeaker 16 when sense element 21 is disposed on or near an opposite side of housing from loudspeaker 16. In one embodiment, the further sense element 25 is positioned from loudspeaker 16, the less time processing circuit 20 will have to calculate corrections, such as echo cancellation. In other embodiments, sense element 25 may be positioned further from loudspeaker 16 than sense element 21.

In another embodiment, sense elements 21 and 25 are at least 1 centimeter apart from one another, 2 centimeters apart, or 5 centimeters or more apart, regardless of where they are positioned on or around device 10.

According to one advantageous aspect, sense elements 21 and 25 are not the same model sense elements. For example, sense elements 21 and 25 can have at least one different characteristic or a plurality of different characteristics, wherein the characteristics can comprise frequency response, self noise or equivalent noise, maximum sound pressure level (SPL), clipping level, dynamic range, and sensitivity.

Sense elements 21 and 25 can further be configured to receive an audible signal from loudspeaker 16 out of phase with each other, wherein sense element 21 is configured to receive the audible signals in the first phase, sense element 25 is configured to receive audible signals in the second phase, and the first phase is different than the second phase. Phases can further be substantially different. For echo cancellation, phase can be changed by inverting the signal received by one of sense elements 21, 25 if sense elements 21, 25 are roughly equidistant from loudspeaker 16. If sense elements 21, 25 are at different distances from loudspeaker 16, the difference in phase angle may increase with increasing frequency. Processor 20 can be configured to correct for these phase differences as part of the echo canceling process.

In one exemplary embodiment, sense elements 21 and 25 have a known phase relationship with signals received from loudspeaker 16, and have other known acoustical characteristics at the time of manufacture of device 10. According to a further advantage, in one embodiment, sense element 25 and processing circuit 20 need not be tuned to the resonant frequency of loudspeaker 16.

Figure 5:
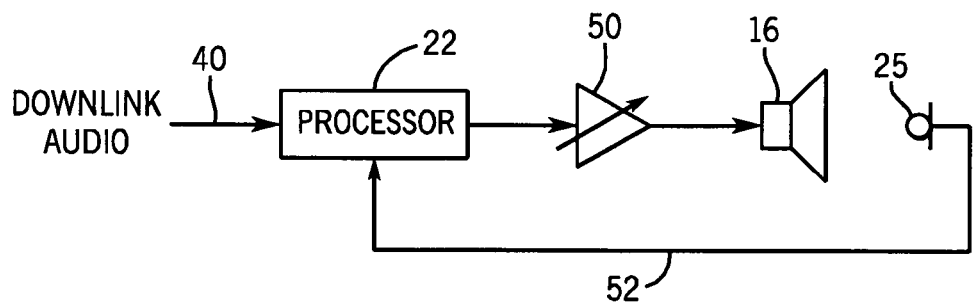
FIG. 5 is a block diagram of a system for reducing distortion in an audible signal provided by a loudspeaker, according to an exemplary embodiment.

Referring now to FIG. 5, an exemplary system for distortion reduction, linearization, or other processing of an audible signal provided by a loudspeaker will be described. In this embodiment, downlink audio signal 40 is provided to processor 22. Processor 22 can comprise digital and/or analog circuit components and/or software instructions configured to process downlink audio signal 40 for playing via loudspeaker 16. Processor 22 can comprise a digital signal processor, a negative feedback circuit, a feed forward circuit, etc. Processor 22 can further comprise echo cancellation, filtering, or other processing functions. Processor 22 is configured to provide the processed audio signal to an amplifier 50 which can be a variable amplifier configured to be controlled by user input or an application to adjust volume. Amplifier 50 is configured to provide the amplified signal to loudspeaker 16 to provide an audible signal. Sense element 25 is configured to sense the audible signal provided by loudspeaker 16 and to provide a sensed signal 52 to processor 22. Processor 22 is configured to process the downlink audio signal 40 based on sensed signal 52. For example, processor 22 may be configured to linearize the audible signal output by loudspeaker 16 based on sensed signal 52. Linearization can be used to reduce non-linearities in the output of loudspeaker 16. Linearization may comprise taking any characteristic with curves or lumps in it and providing a flatter, more linear output characteristic. For distortion or sensitivity, a curve of distortion versus amplitude may have a pronounced shoulder region (e.g. due to mechanical or magnetic non-linearity). For frequency response, variations in sensitivity versus frequency (e.g. due to various resonances) can be present. Linearization may also refer to linearizing the speaker in terms of flat frequency response. Processor 22 may be configured to reduce, attenuate, or eliminate any of these or other types of nonlinearities. A feedback-type linearization scheme may use adaptive and/or predictive algorithms to provide complementary pre-distortion to or compression of the output signal. By linearizing the output of loudspeaker 16, distortion can be reduced.

Processor 22 can further be configured to provide echo cancellation, non-linear processing, noise gating, etc.

Figure 6:
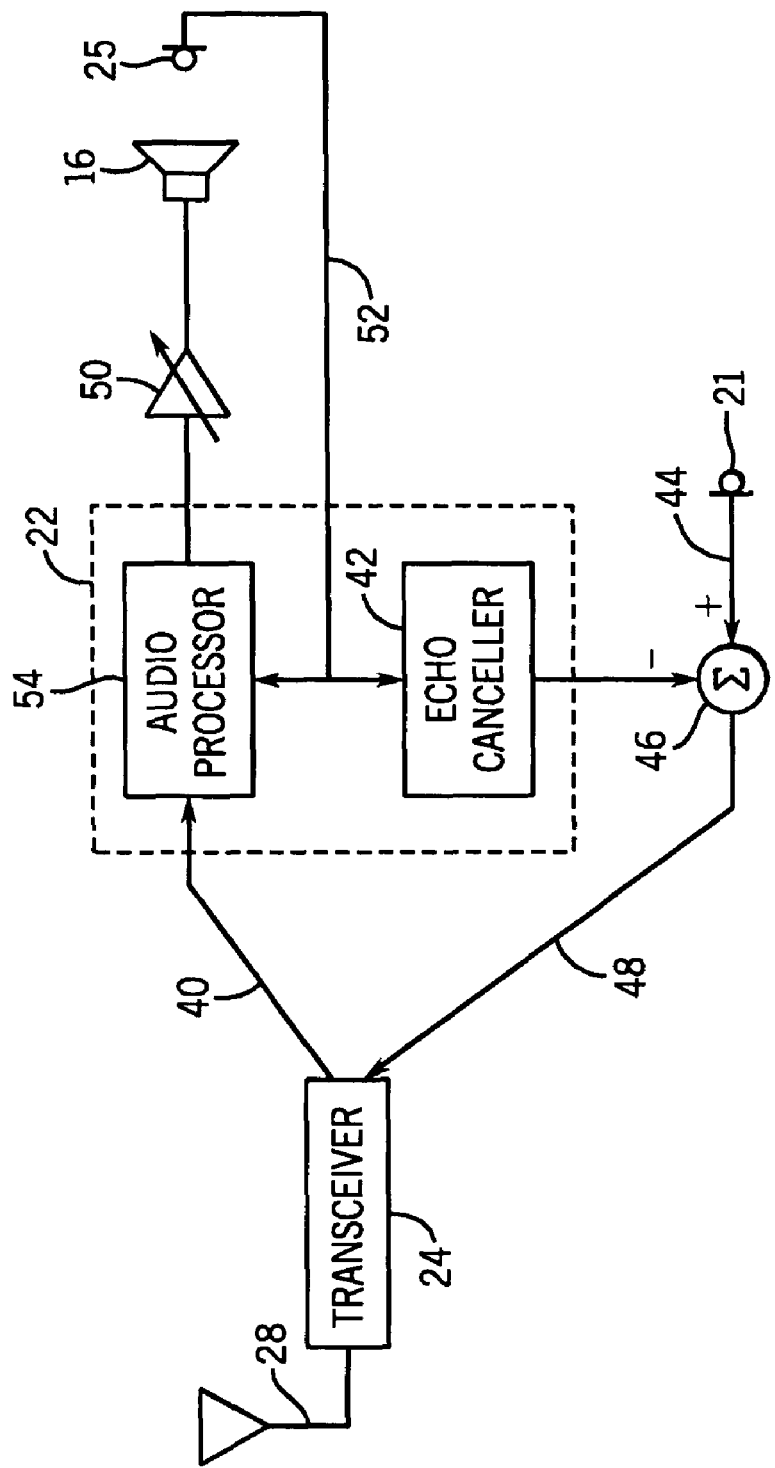
FIG. 6 is a block diagram of a system for improved loudspeaker functionality, according to an exemplary embodiment.

Referring now to FIG. 6, an exemplary system is shown providing a sense element 25 which may be used to reduce or attenuate acoustical feedback from loudspeaker 16 to sense element 21 and may further be used to reduce distortion in an audible signal provided by loudspeaker 16. In this embodiment, antenna 28 is configured to receive a wireless telephony signal (or other wireless signal) and to provide a signal comprising audio data (which may be a teleconference, video conference, etc.) to transceiver circuit 24. Transceiver circuit 24 comprises analog and/or digital components configured to provide a downlink audio signal 40 to processor 22 and to receive an uplink audio signal 48 and provide the uplink signal via antenna 28 to a remote device, such as a cellular telephony tower, nearby wireless device (e.g., nearby laptop, smart phone, mobile phone, Bluetooth-enabled phone, etc.). Processor 22 comprises an audio processor 54 and echo canceller 42. Audio data can alternatively be provided from memory associated with device 10, for example from a digital voice recorder, game application, audio file (e.g., .wav, .mp3, etc.) or other audio source. Audio processor 54 is configured to process downlink audio signal 40 to provide an echo canceller, noise gate, filtering, non-linear processing, etc. Audio processor 54 is configured to provide the processed audio signal to amplifier 50 which provides an output signal to loudspeaker 16. Sense element 25 is configured to provide an input to audio processor 54 and echo canceller 42. Audio processor 54 and echo canceller 42 can be different software applications on a single integrated circuit or may comprise separate integrated circuits (e.g., different chips, dual-core chip, etc.). Further, echo canceller 42 may be a portion of audio processor 54. Audio processor 54 is configured to linearize the audio signal provided to amplifier 50 based on sensed signal 52. Audio processor 54 may be configured to provide negative feedback, a feed forward process, a digital signal processor, etc. Echo canceller 42 is configured to provide an echo canceling process to first audio signal 44 and to attenuate or reduce acoustic coupling between loudspeaker 16 and sense element 21 using echo canceller 42 and summation circuit 46. Echo canceller 42 and summation circuit 46 are configured to provide uplink audio signal 48 which can be further processed by other processing steps (e.g., amplifying, frequency modification, filtering, etc.) prior to being sent via transceiver circuit 24 to remote electronic device.

Figure 7:
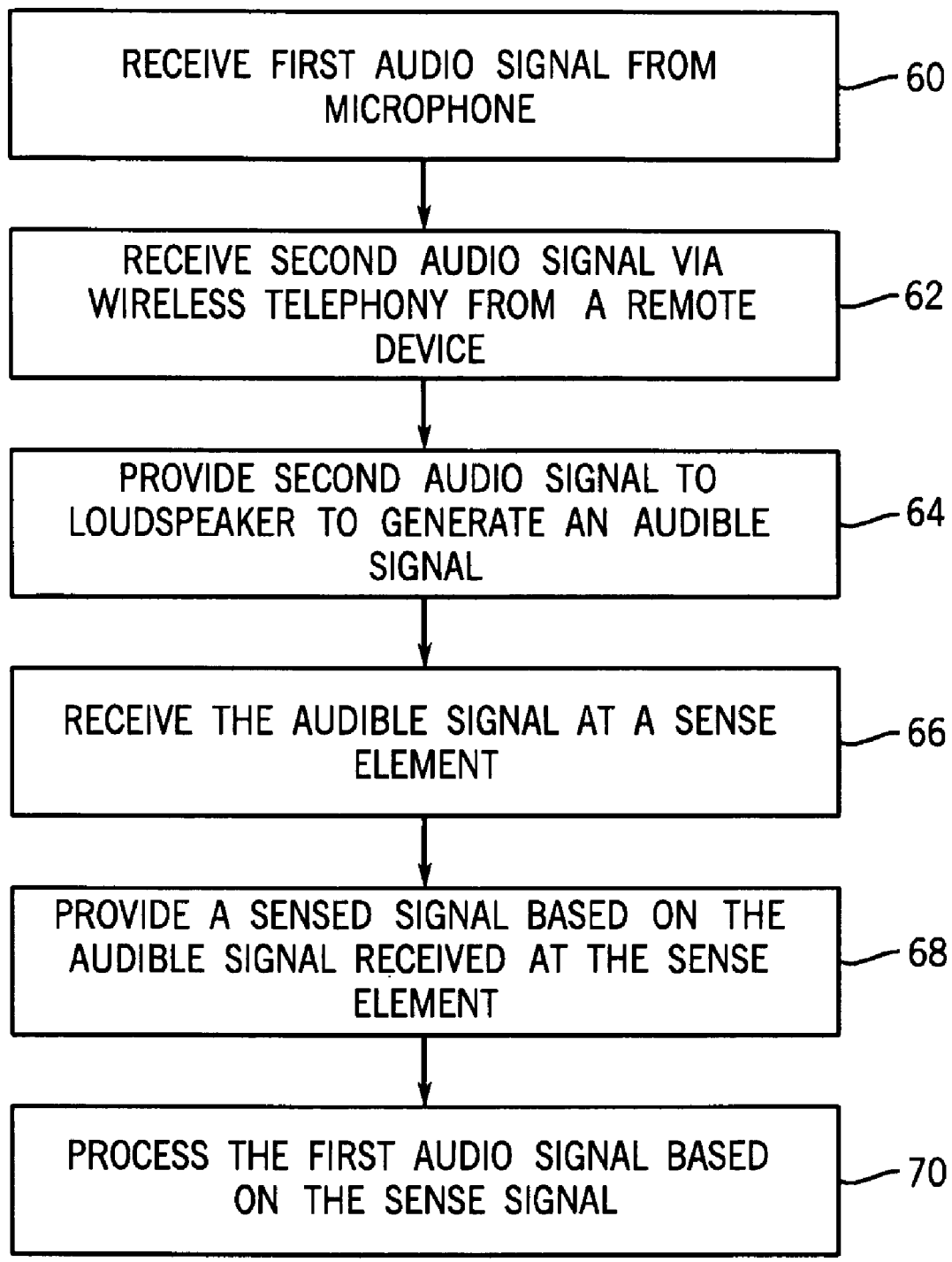
FIG. 7 is a flowchart showing a method for reducing acoustical feedback from a loudspeaker to a microphone, according to an exemplary embodiment.

Referring now to FIG. 7, an exemplary method is shown for reducing acoustical feedback from a loudspeaker to a microphone. In step 60, a first audio signal is received from the microphone. In step 62, a second audio signal is received via wireless telephony from a remote device. At step 64, the second audio signal is provided to a loudspeaker to generate an audible signal. At step 66, the audible signal is received at a sense element. The audible signal may be received substantially out of phase with the audible signal when received at the microphone. In an alternative embodiment, the audible signal received at sense element 25 could have any phase relationship to the audible signal received at microphone 21; provided the phase relationship was known or predetermined, processing circuit 20 may be configured to adjust the phase of the audible signal received at microphone 21 (or sense element 25) electronically or digitally. Alternatively, or in addition, the sense element may be positioned closer to or further from loudspeaker than the microphone, as discussed hereinabove. At step 68, a sensed signal is provided based on the audible signal received with the sense element. At step 70, the first audio signal is processed based on the sensed signal. For example, an echo canceling process can be provided, or other processing, such as filtering, amplification, frequency adjustment, linearization, non-linear processing, etc. Steps 60-70 can be provided in a device which is further configured to operate a plurality of personal information management applications and to synchronize personal information from the applications with another remote computer (e.g., via a wired or wireless connection).

Figure 8:
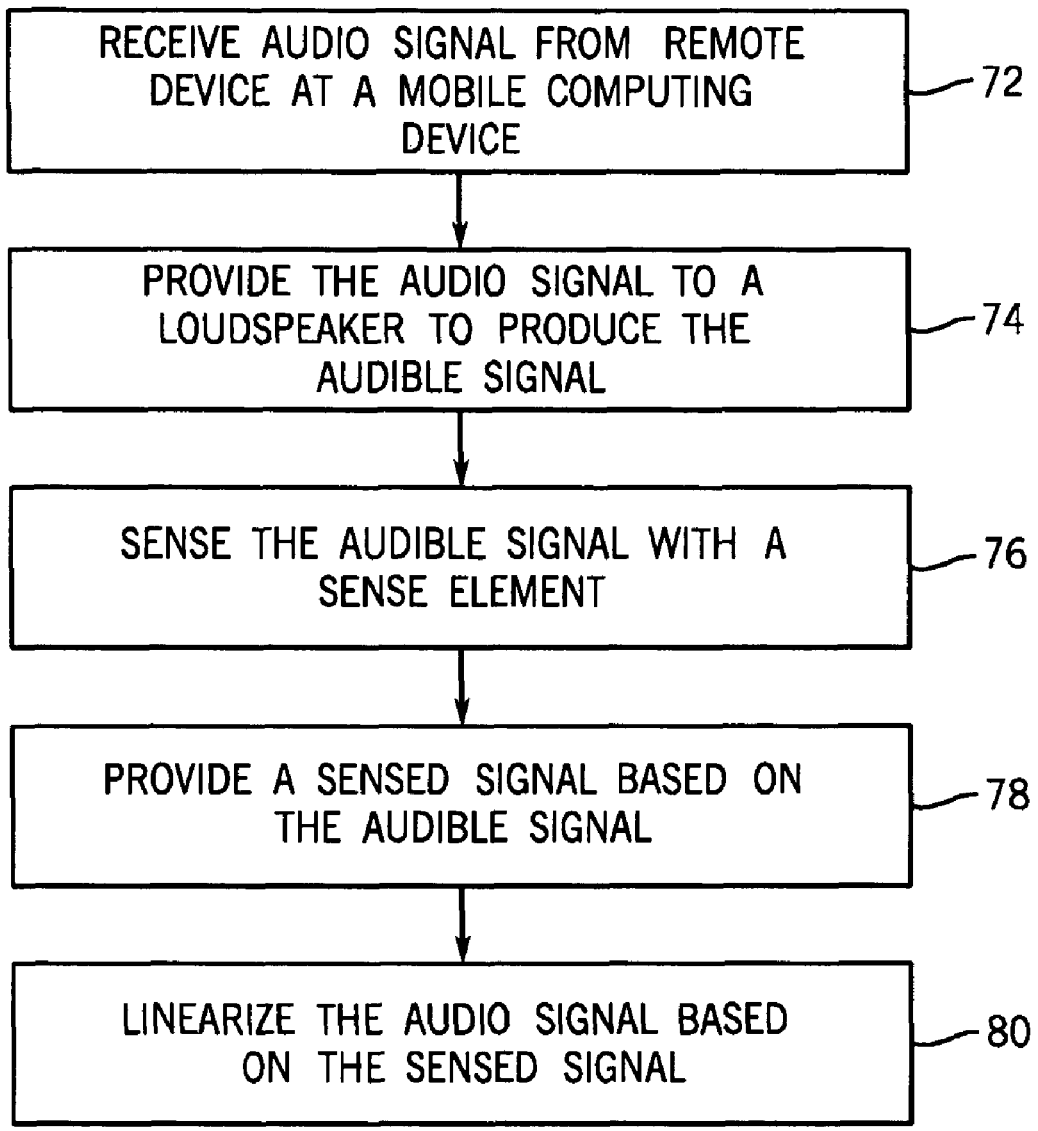
FIG. 8 is a flowchart showing a method for reducing distortion in an audible signal provided by a loudspeaker, according to an exemplary embodiment.

Referring now to FIG. 8, an exemplary method of reducing distortion in an audible signal provided by a loudspeaker is shown. At step 72, an audio signal is received from a remote device at a mobile computing device. At step 74, the audio signal is provided to a loudspeaker to produce the audible signal. At step 76, the audio signal is sensed with a sense element. At step 78, a sensed signal is provided based on the audible signal. At step 80, the audio signal provided by the loudspeaker is linearized based on the sensed signal. Steps 72-80 can further be provided in a device which is also configured to operate a plurality of personal information management applications and synchronize personal information from the applications with another computer.

References in the claims to processing a signal or "the" signal should be understood to also encompass processing a signal derived from the signal or otherwise downstream of the processing of the signal. Further, different elements or steps of the various embodiments may be combined with other elements or steps of the various embodiments described herein. Further, the configurations disclosed herein may be used in applications to address audio processing problems other than those disclosed herein.

According to one advantage, loudspeaker 16 is substantially non-linear, thereby making its behavior unpredictable. The systems and methods described hereinabove can be provided to sense or detect this non-linearity and compensate or adjust for the non-linearity using one or more of the processing circuits disclosed herein. One result can be reduced distortion in the audio provided by loudspeaker 16.

While the exemplary embodiments illustrated in the Figs. and described above are presently exemplary, it should be understood that these embodiments are offered by way of example only. For example, the teachings herein can apply to a home or car audio system. Also, sensed signals from sense element 25 can be processed by processor 22 in manners other than those shown above to address other methods of improving loudspeaker functionality. Accordingly, the present invention is not limited to a particular embodiment, but extends to various modifications that nevertheless fall within the scope of the appended claims.

What is claimed is:

1. An electronic device, comprising:
    a housing;
    a microphone configured to receive a first audio signal, the microphone provided on a front face of the housing;
    a transceiver circuit configured to communicate the first audio signal to a remote device and to receive a second audio signal from the remote device;
    a loudspeaker configured to provide an audible signal based on the second audio signal, the loudspeaker provided on a rear face of the housing;
    a sense element configured to sense the audible signal provided by the loudspeaker and provide a sensed signal, wherein the sense element is positioned at a distance from the loudspeaker different than a distance between the microphone and the loudspeaker; and
    a processing circuit configured to process at least one of the first audio signal and the second audio signal based on the sensed signal, wherein processing at least one of the first audio signal and the second audio signal includes (i) using an echo cancellation process on the sensed signal, and (ii) delaying the sensed signal by a predetermined amount, the predetermined amount is based at least in part on an acoustical characteristic of an acoustic path between the loudspeaker and the sense element and at least in part on an acoustical characteristic of an acoustic path between the loudspeaker and the microphone.

2. The electronic device of claim 1, wherein the processing circuit is configured to process the second audio signal based on the sensed signal from the sense element.

3. The electronic device of claim 2, wherein the processing circuit is configured to linearize the audible signal output by the loudspeaker based on the sensed signal from the sense element.

4. The electronic device of claim 3, wherein the processing circuit comprises at least one of a negative feedback circuit and a feed forward circuit configured to linearize the audible signal output by the loudspeaker.

5. The electronic device of claim 1, wherein the electronic device is a mobile computing device.

6. The electronic device of claim 5, wherein the electronic device is a handheld device.

7. The electronic device of claim 6, wherein the electronic device comprises a plurality of personal information management applications and the processing circuit is configured to synchronize personal information from the applications with another computer.

8. The electronic device of claim 1, wherein the sense element is positioned closer to the loudspeaker than the microphone.

9. The electronic device of claim 8, wherein the sense element is positioned within approximately 2 centimeters of the loudspeaker.

10. The electronic device of claim 1, wherein the microphone is configured to receive the audible signal with a first phase and the sense element is configured to receive the audible signal with a second phase different than the first phase.

11. The electronic device of claim 1, wherein the microphone and sense element have a plurality of substantially different characteristics.

12. A method of reducing acoustical feedback from a loudspeaker to a microphone of a computing device, the method being performed by one or more processors of the computing device and comprising:
    receiving a first audio signal from the microphone;
    receiving a second audio signal via wireless telephony from a remote device;
    providing the second audio signal to the loudspeaker, the loudspeaker generating an audible signal based on the second audio signal;
    receiving a sensed signal from a sense element, the sense element configured to (i) receive the audible signal substantially out of phase with the microphone, and (ii) generate the sensed signal based on the audible signal; and
    processing the first audio signal based on the sensed signal, wherein processing the first audio signal includes (i) using an echo cancellation process on the sensed signal, and (ii) delaying the sensed signal by a predetermined amount, the predetermined amount based at least in part on an acoustical characteristic of an acoustic path between the loudspeaker and the sense element and at least in part on an acoustical characteristic of an acoustic path between the loudspeaker and the microphone.

13. The method of claim 12, further comprising receiving the audible signal at a sense element positioned closer to the loudspeaker than the microphone.

14. The method of claim 12, further comprising:
    operating a plurality of personal information management applications; and
    synchronizing personal information from the applications with another computer.

15. A method of improving loudspeaker functionality of a mobile computing device, the method being performed by one or more processors of the mobile computing device and comprising:

receiving a first audio signal from a microphone of the mobile computing device, the mobile computing device comprising an earpiece speaker provided on a first side of the mobile computing device and a loudspeaker provided on a second side of the mobile computing device opposite the first side;

receiving a second audio signal via wireless telephony from a remote device;

providing the second audio signal to the loudspeaker, the loudspeaker generating an audible signal based on the second audio signal;

receiving a sensed signal from a sense element, the sense element configured to (i) receive the audible signal, and (ii) generate: the sensed signal based on the audible signal;

processing the first audio signal based on the sensed signal, wherein processing the first audio signal includes (i) using an echo cancellation process on the sensed signal, and (ii) delaying the sensed signal by a predetermined amount, the predetermined amount based at least in part on an acoustical characteristic of an acoustic path between the loudspeaker and the sense element and at least in part on an acoustical characteristic of an acoustic path between the loudspeaker and the microphone; and linearizing the second audio signal based on the sensed signal.

16. The method of claim 15, wherein the step of linearizing comprises providing at least one of a negative feedback circuit and a feed forward circuit.

17. The method of claim 15, wherein the step of linearizing is provided by a digital signal processor.

18. The method of claim 15, further comprising:

operating a plurality of personal information management applications; and synchronizing personal information from the applications with another computer.

* * * * *

UNITED STATES PATENT AND TRADEMARK OFFICE
CERTIFICATE OF CORRECTION

PATENT NO.        : 8,311,590 B2                                   Page 1 of 1
APPLICATION NO.   : 11/634817
DATED             : November 13, 2012
INVENTOR(S)       : Ronald J. Horowitz It is certified that error appears in the above-identified patent and that said Letters Patent is hereby corrected as shown below:

In column 9, line 14, in Claim 15, delete "generate:" and insert -- generate --, therefor.

Signed and Sealed this
Twelfth Day of March, 2013

Teresa Stanek Rea
*Acting Director of the United States Patent and Trademark Office*